(12) United States Patent
Fricke et al.

(10) Patent No.: US 7,728,564 B2
(45) Date of Patent: Jun. 1, 2010

(54) POWER SUPPLY FOR A LOAD CONTROL DEVICE

(75) Inventors: William Bryce Fricke, Emmaus, PA (US); Aaron Dobbins, Macungie, PA (US); James P. Steiner, Royersford, PA (US); Chen Ming Wu, Emmaus, PA (US); Russell Weightman, Abington, PA (US); David J. Perreault, Brookline, MA (US); Ryan Lane, Allentown, PA (US); Joseph William Sapp, Emmaus, PA (US); Kyle A. McCarter, Bethlehem, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 553 days.

(21) Appl. No.: 11/678,373

(22) Filed: Feb. 23, 2007

(65) Prior Publication Data

US 2007/0159153 A1 Jul. 12, 2007

Related U.S. Application Data

(63) Continuation-in-part of application No. 11/447,489, filed on Jun. 6, 2006, now Pat. No. 7,423,413.

(60) Provisional application No. 60/687,691, filed on Jun. 6, 2005, provisional application No. 60/738,083, filed on Nov. 18, 2005.

(51) Int. Cl.
*G05F 1/455* (2006.01)
*H02J 3/12* (2006.01)

(52) U.S. Cl. ...................... 323/242; 323/239

(58) Field of Classification Search ................. 323/235, 323/237, 239, 241, 242, 243, 244, 246; 327/446, 327/452, 455, 456, 469, 476
See application file for complete search history.

(56) References Cited

U.S. PATENT DOCUMENTS

| 3,422,309 | A | 1/1969 | Spira et al. |
| 4,560,909 | A | 12/1985 | Peil |
| 4,563,592 | A | 1/1986 | Yuhasz et al. |

(Continued)

FOREIGN PATENT DOCUMENTS

| GB | 1 432 748 | 4/1976 |
| WO | WO 2006/133173 | 12/2006 |

*Primary Examiner*—Gary L Laxton
(74) *Attorney, Agent, or Firm*—Ostrolenk Faber LLP

(57) ABSTRACT

A load control device is adapted to be disposed in series with an AC voltage source and an electrical load and is operable to provide substantially all voltage provided by the AC voltage source to the load. The load control device comprises a controllably conductive device, a controller, a zero-crossing detector, and a power supply for generating a substantially DC voltage for powering the controller. The power supply is operable to charge an energy storage device to a predetermined amount of energy each half-cycle. The controller is operable to determine when the power supply has stopped charging from the zero-crossing detector each half-cycle, and to immediately render the controllably conductive device conductive to conduct the full load current. Before the controllably conductive device begins to conduct each half-cycle, only a minimal voltage develops across the power supply to allow the energy storage device to charge.

25 Claims, 12 Drawing Sheets

U.S. PATENT DOCUMENTS

| | | |
|---|---|---|
| 4,689,547 A | 8/1987 | Rowen et al. |
| 4,745,351 A | 5/1988 | Rowen et al. |
| 4,782,322 A | 11/1988 | Lechner et al. |
| 4,797,599 A | 1/1989 | Ference et al. |
| 4,841,221 A | 6/1989 | Barney et al. |
| 4,876,498 A | 10/1989 | Luchaco et al. |
| 4,914,327 A * | 4/1990 | Dekker .................. 327/456 |
| 4,954,768 A | 9/1990 | Luchaco et al. |
| RE33,504 E | 12/1990 | Yuhasz et al. |
| 5,017,837 A | 5/1991 | Hanna et al. |
| 5,189,412 A | 2/1993 | Mehta et al. |
| 5,365,154 A | 11/1994 | Schneider et al. |
| 5,811,963 A | 9/1998 | Elwell |
| 6,262,565 B1 | 7/2001 | Williams et al. |
| 6,347,028 B1 | 2/2002 | Hausman, Jr. et al. |
| 6,396,672 B1 | 5/2002 | Deam |
| 6,603,221 B1 * | 8/2003 | Liu .......................... 307/125 |
| 6,646,843 B1 | 11/2003 | Newman, Jr. et al. |
| 6,969,959 B2 | 11/2005 | Black et al. |
| 7,005,762 B2 * | 2/2006 | Black et al. ............. 307/139 |
| 7,012,518 B2 | 3/2006 | Novikov |
| 7,034,899 B2 | 4/2006 | Symoen et al. |
| 7,190,124 B2 | 3/2007 | Kumar et al. |
| 7,193,404 B2 | 3/2007 | Weightman |
| 7,423,413 B2 * | 9/2008 | Dobbins et al. ......... 323/242 |
| 2005/0275354 A1 | 12/2005 | Jausman, Jr. et al. |
| 2006/0255745 A1 | 11/2006 | DeJonge et al. |
| 2006/0255959 A1 | 11/2006 | Salvestrini |
| 2007/0001654 A1 | 1/2007 | Newman, Jr. |
| 2007/0159153 A1 | 7/2007 | Fricke et al. |

* cited by examiner

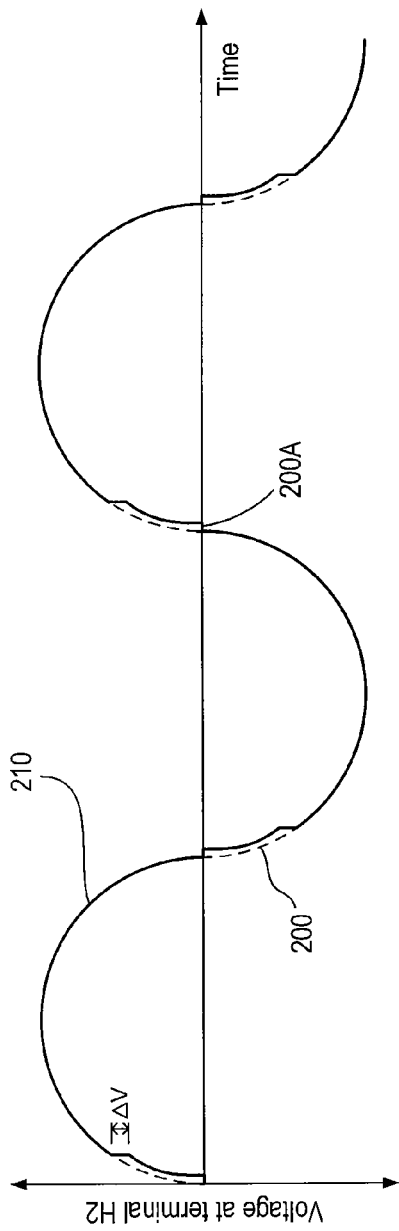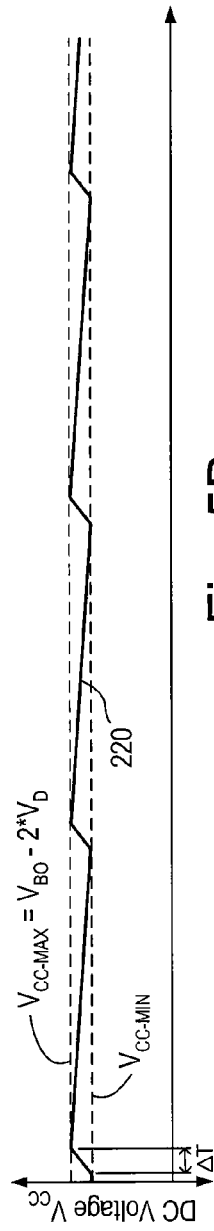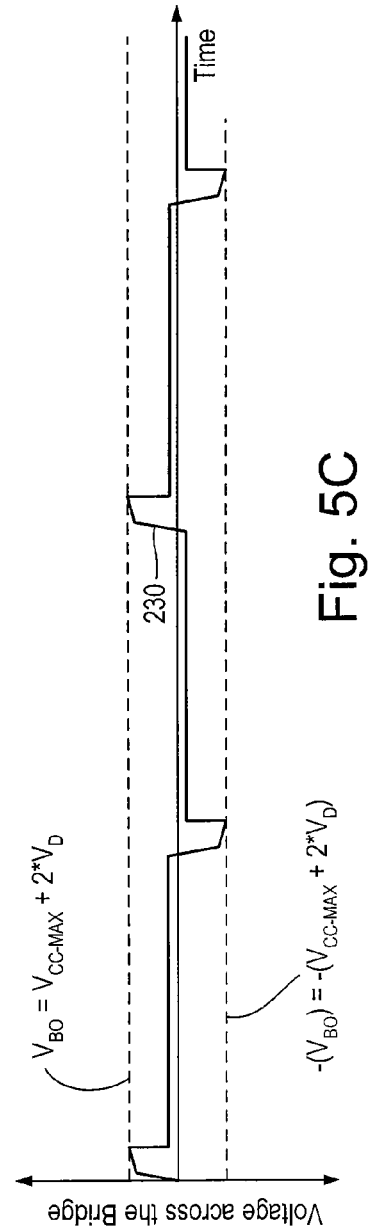

POWER SUPPLY FOR A LOAD CONTROL DEVICE

RELATED APPLICATIONS

This application is a continuation-in-part of commonly-assigned U.S. patent application Ser. No. 11/447,489, filed Jun. 6, 2006, entitled POWER SUPPLY FOR A LOAD CONTROL DEVICE, which claims priority from commonly-assigned U.S. Provisional Application Ser. No. 60/687,691, filed Jun. 6, 2005, and from commonly-assigned U.S. Provisional Application Ser. No. 60/738,083, filed Nov. 18, 2005, both having the same title as the present application. The entire disclosures of all of the above applications are hereby incorporated by reference.

BACKGROUND OF THE INVENTION

1. Field of the Invention

The present invention relates to load control systems for controlling the amount of power delivered to an electrical load, such as a lighting load or a motor load, from an alternating-current (AC) power source. More specifically, the invention relates to a load control device having a power supply and a controller, and operable to provide substantially all of a supply voltage of the AC power source to the electrical load.

2. Description of the Related Art

It is often desirable to include a lamp in the same enclosure as a fan motor. Since the lamp and the fan motor are often wired in parallel, the lamp and the fan motor are generally controlled together from a switch located remotely from the lamp and the fan motor. FIG. 1A shows a prior art light and fan motor control system 10. The system 10 includes a maintained switch 12 coupled between an alternating-current (AC) voltage source 14 and two loads: a fan motor 16 and a lighting load 18. The fan motor 16 and the lighting load 18 are connected in parallel such that when switch 12 is closed the fan motor 16 and the lighting load 18 will both be on, and when the switch 12 is open the fan motor 16 and the lighting load 18 will both be off.

There are also various schemes for independent control of a fan motor as well as a lighting load from a remote location such as a wallstation. FIG. 1B shows a prior art light and fan motor control system 20, having a dual light and fan speed control 22 coupled to the AC voltage source 14. The dual light and fan speed control 22 has two outputs: the first output coupled to the fan motor 16 and the second output coupled to the lighting load 18, to allow for independent control of the loads. Further, the dual light and fan speed control 22 includes a fan speed circuit for adjusting the speed at which the fan motor 16 turns and a dimmer circuit for changing the intensity of the lighting load 18. The dual light and fan speed control 22 is often mounted in a standard electrical wallbox and includes a user interface to allow a user to separately control the lighting load and the fan motor.

However, the dual light and fan speed control 22 requires two separate wires to be connected between the control and the loads, i.e., the lighting load 18 and the fan motor 16. If these two connections are not provided between the wallbox and the enclosure containing the lamp and the fan motor, independent control of the lighting load and the fan motor will not be possible. Further, in the system 20 of FIG. 1B, it is only possible to have one dual light and fan speed control 22, and thus, only one user interface to allow for adjustment of the light intensity and the fan speed. Control of the fan motor and lighting load from more than one location is not possible in this system.

Thus, it is desirable to provide a reliable means to independently control from a remote location a fan motor and a lighting load that are located in the same enclosure. Since a consumer may wish to locate the fan motor and the attached lamp in a position previously occupied by only a lamp controlled by a standard single-pole single-throw wall switch, it is desirable to be able to control the fan motor as well as the attached lamp independently, using a two-wire control device. A two-wire control device is a control device that has only two electrical connections (one connection to the AC voltage source and the other connection to the enclosure containing the lamp and the fan motor) and does not have a neutral connection. As shown in FIG. 1A, this kind of system typically only includes a switch in series electrical connection between the AC voltage source and the lamp/fan and no neutral connection is available in the electrical wallbox where the switch is housed. Since it is desirable to control the fan motor and the lamp independently, using the existing building wiring, it is necessary to develop a means to allow independent control over the existing building wiring consisting of a single pair of wires connecting the remote wallstation to the lamp/fan apparatus.

Such a remote wallstation preferably includes a microcontroller to receive inputs from a user interface and to communicate with a load control device in the enclosure of the lighting load and the fan motor. To power the microcontroller with a substantially direct-current (DC) voltage, the wallstation must also include a DC power supply.

Thus, there exists a need for a power supply for a two-wire load control device that passes as much of the voltage from the AC voltage source to the loads (or another load control device) as possible and derives a minimal amount of power from the AC voltage source to power a microcontroller and other low-voltage circuitry.

SUMMARY OF THE INVENTION

According to the present invention, a load control device for controlling the amount of power delivered to an electrical load from an AC power source comprises a controllably conductive device, a power supply, and a controller. The controllably conductive device is adapted to carry a load current from the AC power source to the load when the controllably conductive device is conductive. The power supply comprises an energy storage device and is adapted to charge the energy storage device when the controllably conductive device is non-conductive. A controller is operable to determine when the power supply has charged the energy storage device to a predetermined amount of energy and to subsequently cause the controllably conductive device to become conductive immediately after determining that the power supply has charged the energy storage device to the predetermined amount of energy.

According to another embodiment of the present invention, a load control device for controlling the amount of power delivered to an electrical load from an AC power source comprises a controllably conductive device, an energy storage device, a charging circuit, and a control circuit. The controllably conductive device is adapted to carry a load current from the AC power source to the load when the controllably conductive device is conductive. The charging circuit is adapted to charge the energy storage device when the controllably conductive device is non-conductive. The control circuit is operable to cause the controllably conductive device to become conductive immediately after the energy storage device has charged to a predetermined amount of energy.

The present invention further provides a method of generating a DC voltage in a load control device adapted to be disposed in series electrical connection between an AC voltage source and an electrical load. The method comprises the steps of: (1) coupling a controllably conductive device in series electrical connection between the AC voltage source and the electrical load; (2) charging an energy storage device when the controllably conductive device is non-conductive; (3) stopping the charging of the energy storage device when the energy storage device has charged to a predetermined amount of energy; and (4) rendering the controllably conductive device conductive when the energy storage device has charged to the predetermined amount of energy.

According to another aspect of the present invention, a load control device for controlling the amount of power delivered to an electrical load from an AC power source comprises a controllably conductive device, a power supply, and controller coupled to the power supply. The controllably conductive device is adapted to control the amount of power delivered from the source to the load to turn the load on and off. The power supply comprises an energy storage device, a passive charging path for charging the energy storage device, and an active charging path for charging the energy storage device. The passive charging path is operable to conduct a substantially sinusoidal current having a first magnitude when the active charging path is disabled. The active charging path is operable to conduct a non-sinusoidal current having a second magnitude greater than the first magnitude when the active charging path is enabled. A controller is coupled to the power supply and operable to enable the active charging path when the load is on and to disable the active charging path when the load is off.

In addition, the present invention provides a method of controlling the amount of power delivered to an electrical load from an AC power source. The method comprises the steps of: (1) coupling a controllably conductive device in series electrical connection between the AC voltage source and the electrical load; (2) controlling the controllably conductive device to be conductive each half-cycle of the AC power source to turn the load on; (3) controlling the controllably conductive device to be non-conductive each half-cycle of the AC power source to turn the load off; (4) charging an energy storage device by conducting a substantially sinusoidal current having a first magnitude through the energy storage device when the load is off; and (5) charging the energy storage device by conducting a non-sinusoidal current having a second magnitude through the energy storage device when the load is on, the second magnitude greater than the first magnitude.

Other features and advantages of the present invention will become apparent from the following description of the invention, which refers to the accompanying drawings.

BRIEF DESCRIPTION OF THE DRAWINGS

The invention will now be described in greater detail in the following detailed description with reference to the drawings in which:

FIGS. 5A, 5B, and 5C show waveforms demonstrating the operation of the power supply of FIG. 4A;

DETAILED DESCRIPTION OF PREFERRED EMBODIMENTS OF THE INVENTION

Figure 1A:
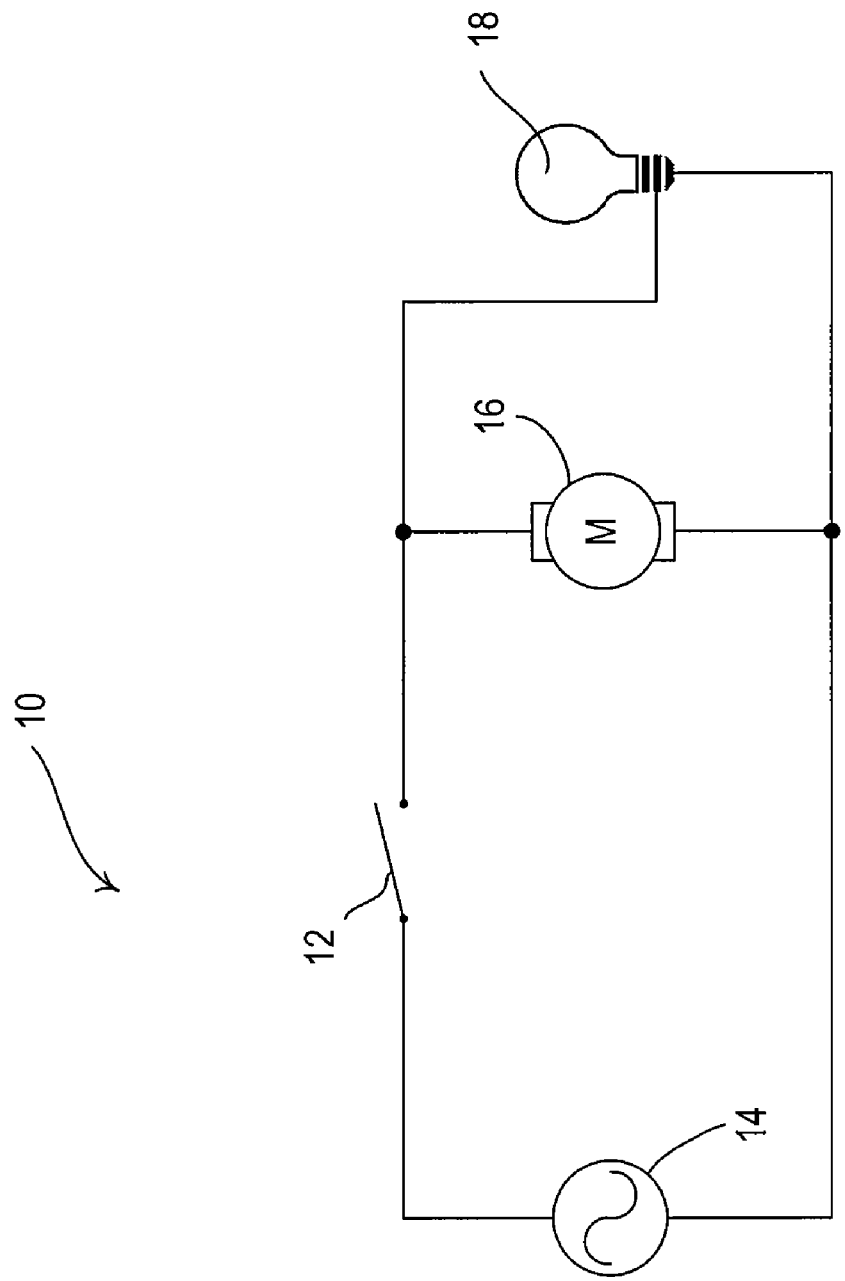
FIG. 1A is a simplified block diagram of a prior art light and fan motor control system.
Figure 1B:
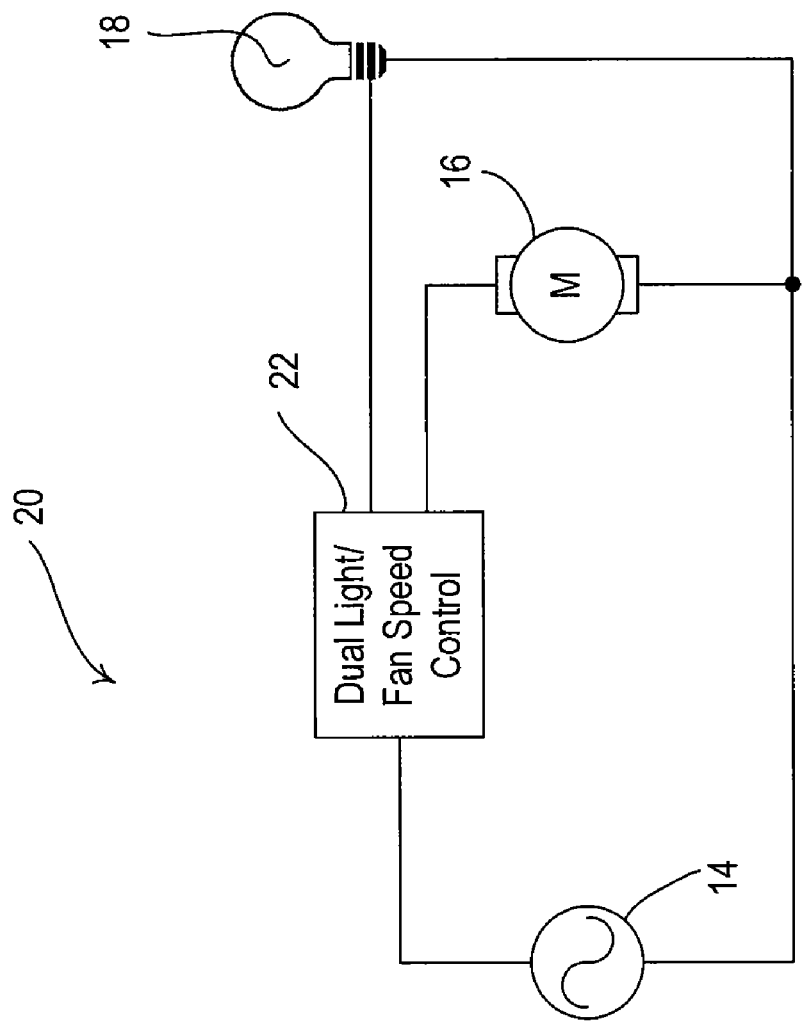
FIG. 1B is a simplified block diagram of a prior art light and fan motor control system including a dual light and fan speed control.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

As is well known, a lamp and a fan motor are typically packaged in the same housing. It is desirable to be able to control the lamp and fan motor independently from the same remote location, for example, a wallstation. However, the two circuits to control the lamp and the fan motor are typically different. The lamp may be controlled by a series switch, typically a phase-angle dimmer. The fan motor may be controlled by a shunt switch in parallel with the fan motor, which is disclosed in commonly-assigned co-pending U.S. patent application Ser. No. 11/447,728, filed on Jun. 6, 2006, entitled METHOD AND APPARATUS FOR QUIET VARIABLE MOTOR SPEED CONTROL, the entire disclosure of which is hereby incorporated by reference.

Figure 2:
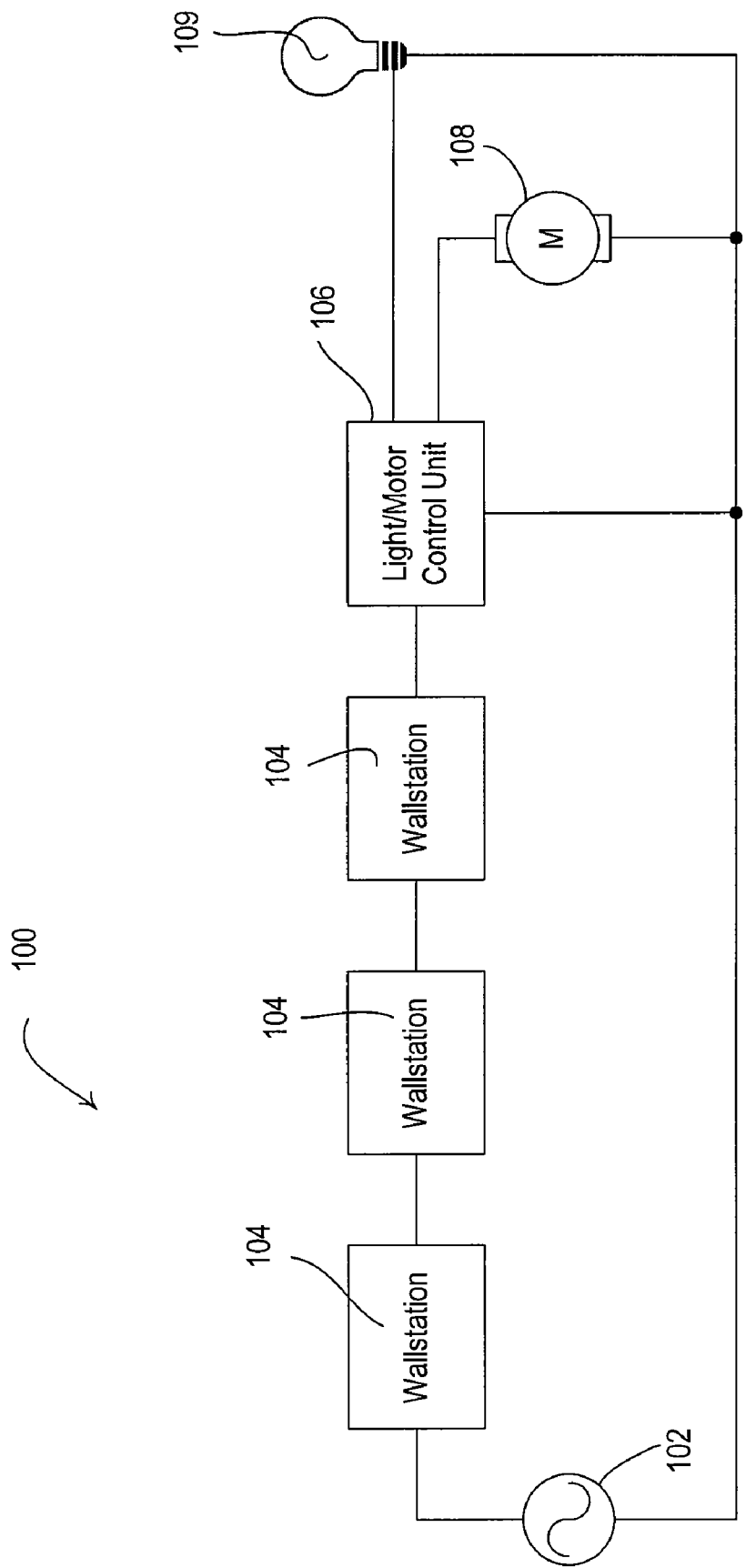
FIG. 2 is a simplified block diagram of a system for control of lights and fan motors according to the present invention to a first embodiment of the present invention.

FIG. 2 is a simplified block diagram of a system 100 for independent control of lights and fan motors according to a first embodiment of the present invention. The system includes a plurality of wallstations 104, i.e., remote controls, which are connected in series between an AC voltage source 102 and a light/motor control unit 106. The light/motor control unit 106 is operable to control both the speed of a fan motor 108 and the intensity of a lighting load 109. The system 100 for independent control of lights and fan motors is described in greater detail in commonly-assigned co-pending U.S. patent application Ser. No. 11/447,431, filed on Jun. 6, 2006, entitled SYSTEM FOR CONTROL OF LIGHTS AND MOTORS, the entire disclosure of which is hereby incorporated by reference.

In the system 100 of FIG. 2, it is desirable to provide substantially the full AC voltage from the AC voltage source 102 to the light/motor control unit 106 for operation of the fan motor 108 and the lighting load 109. Since the wallstations 104 are coupled in series electrical connection, it is desirable to minimize the voltage drop across each wallstation 104. Thus, it is not desirable to develop a significant voltage across each of the wallstations 104 in order to charge an internal DC power supply to power the low-voltage circuitry of the wallstation.

Figure 3:
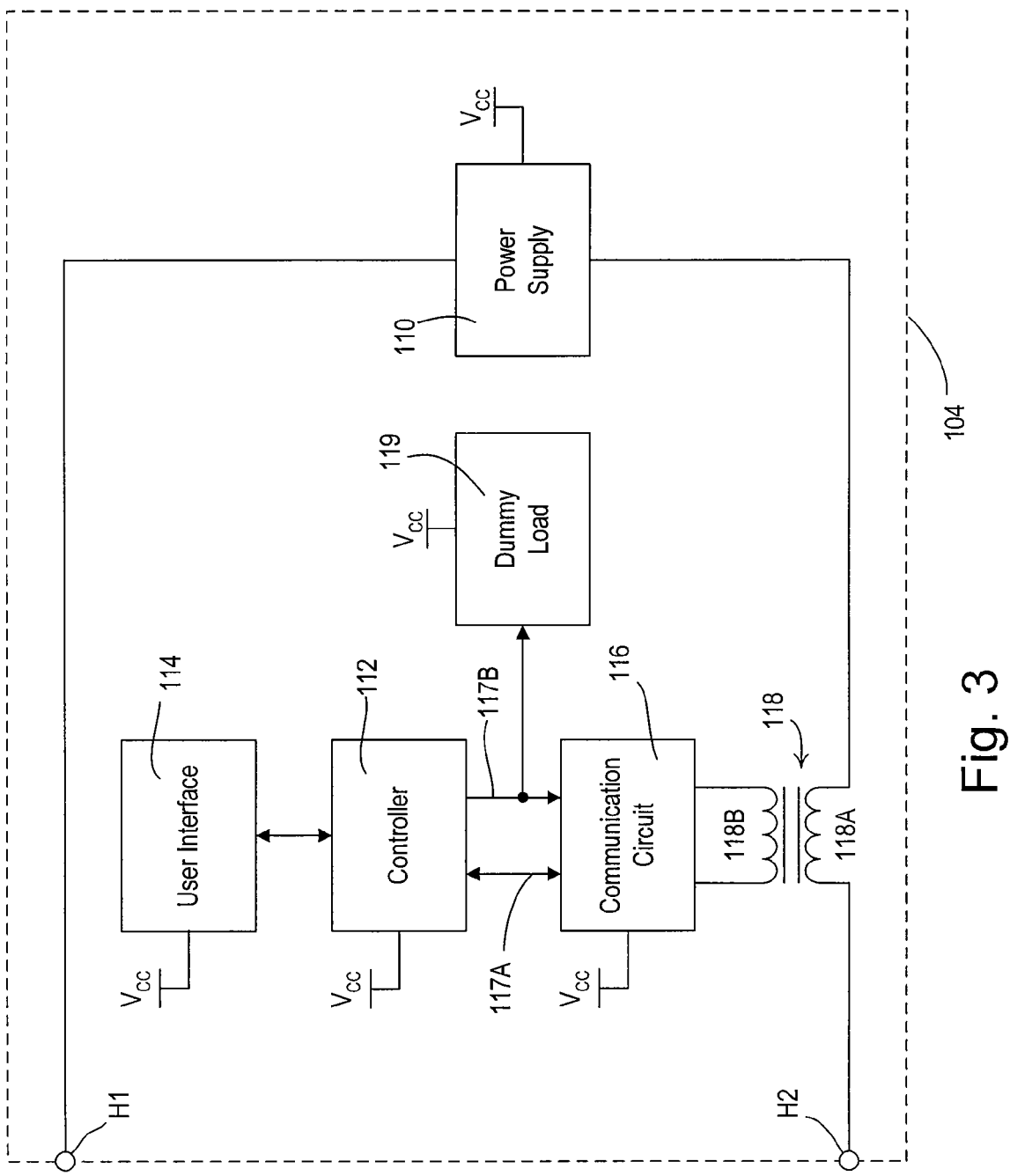
FIG. 3 is a simplified block diagram of a wallstation of the system of FIG. 2 according to the first embodiment of the present invention.

FIG. 3 is a simplified block diagram of the wallstation 104 according to the first embodiment of the present invention. The wallstation 104 includes a power supply 110, a controller 112, a user interface 114, and a communication circuit 116. The power supply 110 is provided in series between a first electrical terminal H1 and a second electrical terminal H2. The power supply 110 provides a DC voltage, $V_{CC}$, to power the controller 112, the user interface 114, and the communication circuit 116. The controller 112 is preferably implemented as a microcontroller, but may be any suitable processing device, such as a programmable logic device (PLD), a microprocessor, an application specific integrated circuit (ASIC), or a field programmable gate array (FPGA).

The user interface 114 includes a plurality of buttons for receiving inputs from a user and a plurality of light emitting diodes (LEDs) for providing feedback to the user. The controller 112 accepts control inputs from the buttons of the user interface 114 and controls the operation of the LEDs. The user interface 114 may also include a wireless communications port for receiving inputs from a wireless transmitter, for example, an infrared (IR) or radio frequency (RF) remote control.

The controller 112 is also coupled to the communication circuit 116 for transmitting and receiving control information to and from the light/motor control unit 106 and the other wallstations 104 of system 100. The control information is transmitted between the controller 112 and the communication circuit 116 via a data signal 117A. The communication circuit 116 transmits and receives the control information via a communications transformer 118 over the hot line, which is coupled from the AC voltage source 102 via the wallstations 104 to the light/motor control unit 106. The communications transformer 118 has a primary winding 118A that is connected in series electrical connection with the terminals H1, H2 of the wallstation 104, and a secondary winding 118B that is coupled to the communication circuit 116.

The controller 112 provides a communication-enable control signal 1171B to the communication circuit 116. When the communication-enable control signal 117B is high, i.e., substantially the same as the DC voltage $V_{CC}$ of the power supply 110, the communication circuit 116 is operable to transmit the control information to the light/motor control unit 106 and other wallstations 104. The communication circuit 116 draws a substantially constant current, e.g., 12 mA, from the power supply 110 when transmitting the control information. When the communication-enable control signal 117B is low, i.e., substantially the same as circuit common, the communication circuit is disabled and draws a substantially minimal current from the power supply 110.

The wallstation 104 further comprises a dummy load 119 that is operable to draw a substantially constant current from the power supply 110 in response to the communication-enable control signal 117B. The operation of the dummy load 119 will be described in greater detail below.

Figure 4A:
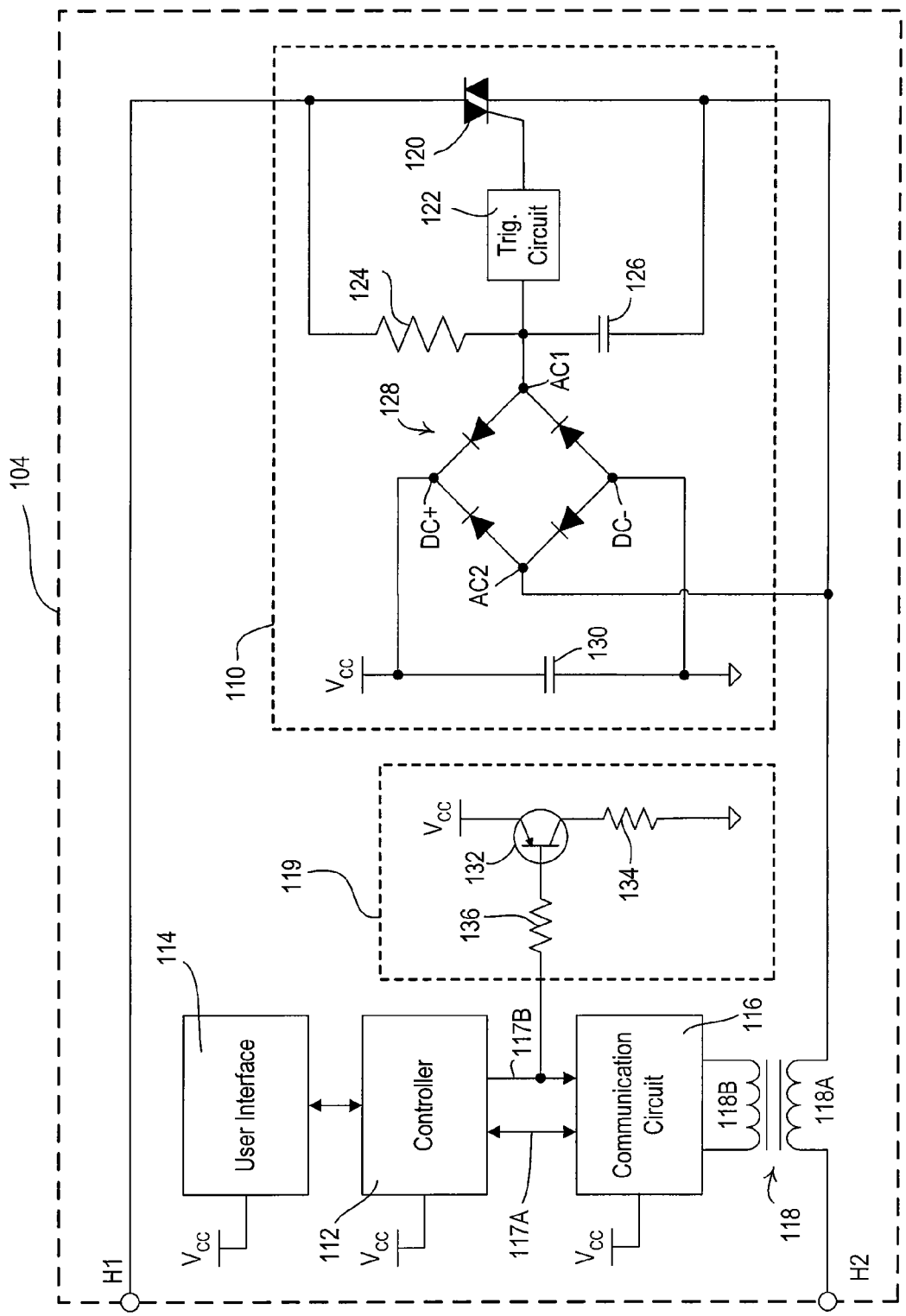
FIG. 4A is a simplified circuit diagram of a power supply of the wallstation of FIG. 3.

Turning to FIG. 4A, the power supply 110 of the wallstation 104 is shown in greater detail. The power supply 110 includes a controllably conductive device, such as a semiconductor switch, for example, a triac 120. The controllably conductive device could also be implemented as a relay or another type of semiconductor switch, such as a field-effect transistor (FET) in a rectifier bridge, two FETs in anti-series connection, or one or more insulated gate bipolar junction transistors (IGBTs). The triac 120 has two main load terminals that are coupled in series between the terminals H1, H2. The triac 120 is operable to be selectively rendered conductive dependent on the input at a gate (i.e., a control input). The triac 120 becomes non-conductive when the current through the triac becomes approximately zero (i.e., at a zero-crossing of the current through the AC voltage source). However, if the semiconductor switch is implemented as two FETs in anti-series connection, for example, the FETs are operable to be selectively rendered non-conductive dependent on the input at the gate.

The gate of the triac 120 is coupled to a triggering circuit 122. The triggering circuit 122 may be implemented as a diac, a sidac, a silicon bilateral switch (SBS), one or more zener diodes, a comparator circuit, or a transistor circuit. A resistor-capacitor (RC) circuit, comprising a limiting resistor 124 and a firing capacitor 126, is coupled across the triac 120. The triggering circuit 122 is coupled in series with the gate of the triac 120 and the junction of the resistor 124 and the firing capacitor 126. The triggering circuit 122 has a break-over voltage, $V_{BO}$, and conducts current to and from the gate of the triac 120 only when the voltage across the firing capacitor 126 exceeds the break-over voltage $V_{BO}$. The limiting resistor 124 preferably has a resistance of 10Ω and the firing capacitor 126 preferably has a capacitance of 0.2 μF.

Figure 4B:
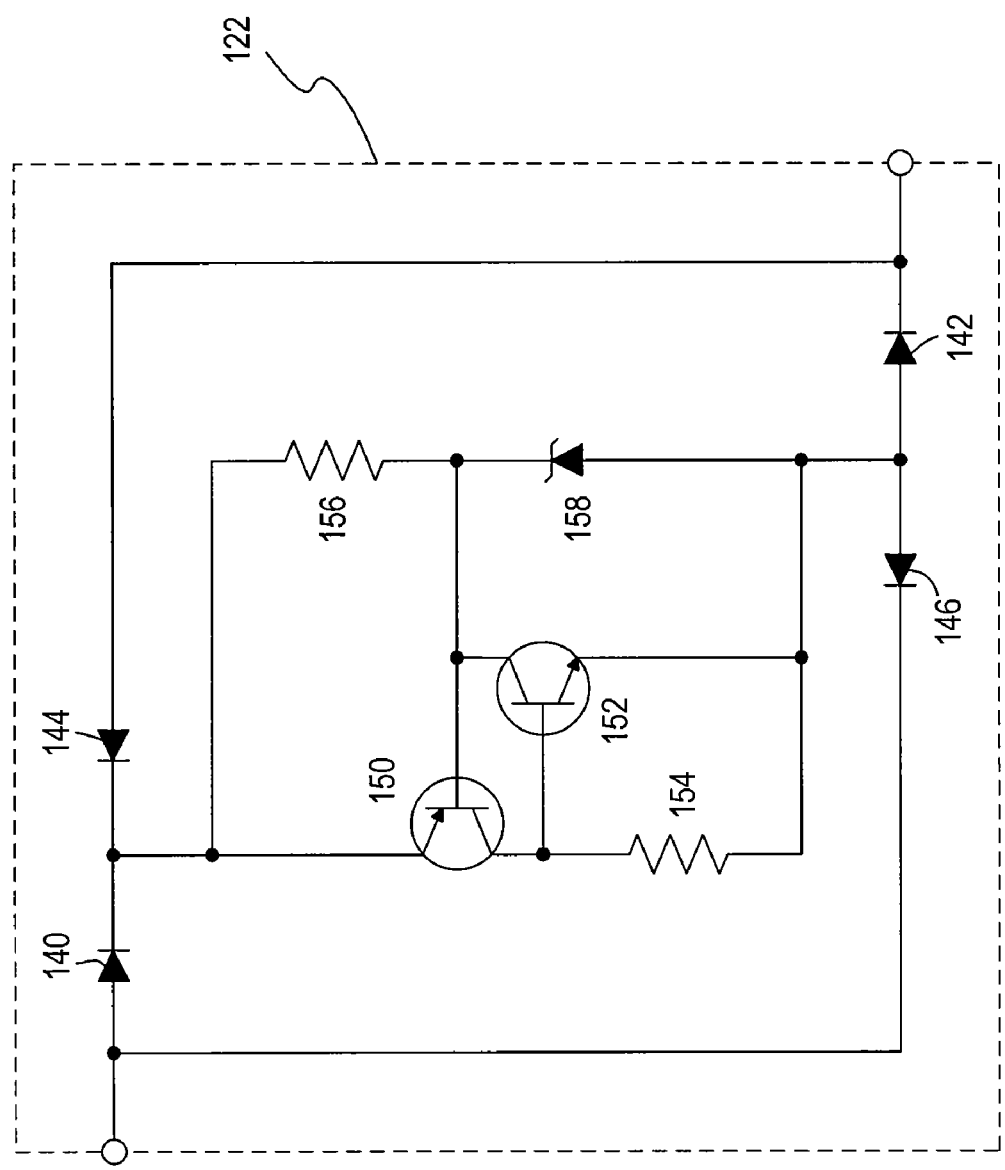
FIG. 4B is a simplified circuit diagram of a triggering circuit of the power supply of FIG. 4A.

FIG. 4B is a simplified schematic diagram of a possible implementation of the triggering circuit 122 of the power supply 110. The triggering circuit 122 includes a rectifier bridge (comprising four diodes 140, 142, 144, 146), two transistors 150, 152, two resistors 154, 156, and a zener diode 158. When the voltage across the triggering circuit 122 exceeds approximately the break-over voltage of the zener diode 158, the zener diode begins conducting current. The break-over voltage of the zener diode 158 defines the break-over voltage $V_{BO}$ of the triggering circuit 122. The transistor 150 begins conducting as the voltage across the resistor 156 reaches the required base-emitter voltage of the transistor 150. A voltage is then produced across the resistor 154, which causes the transistor 152 to begin conducting. This essentially "shorts out" the zener diode 158 such that the zener diode stops conducting and the voltage across the triggering circuit 122 falls to a substantially small voltage, i.e., the sum of the forward voltage drops of two of the diodes 140, 142, 144, 146 of the rectifier bridge, the base-emitter voltage of the transistor 150, and the saturation voltage of the transistor 152, which is typically in the range of 1.7 volts to 2.5 volts. This operation causes a pulse of current to flow through the triggering circuit 122 from the firing capacitor 126 through the gate of the triac 120. The rectifier bridge comprising the diodes 140, 142, 144, 146 allows current to flow through the triggering circuit 122 in both half-cycles.

The power supply 110 also includes a charging circuit comprising a rectifier bridge 128 having two terminals AC1, AC2 that are connected across the firing capacitor 126 and two terminals DC+, DC− that provide the DC voltage $V_{CC}$ across an energy storage device, for example, a storage capacitor 130. The voltage developed across the storage capacitor 130 provides power for the controller 112. The storage capacitor 130 preferably has a capacitance of 680 μF. Herein, the term "charging circuit" means a circuit for causing energy to be stored in an energy storage device and is not intended to be limited to a circuit for causing electrical charge to be stored in a capacitor.

The limiting resistor 124 limits the charging current through the rectifier bridge 128 and the storage capacitor 130.

The limiting resistor 124 may be replaced with a short circuit if the impedance in series with the power supply 110 in the system 100 is enough to limit the peak charging current of the storage capacitor 130 to an appropriate level.

When the voltage across the terminals AC1, AC2 of the rectifier bridge 128, which is also the voltage across the firing capacitor 126, exceeds the break-over voltage $V_{BO}$ of the triggering circuit 122, a gate current flows through the gate of the triac 120 and the triac begins conducting current through the main load terminals. The firing capacitor 126 consistently provides enough charge to produce the gate current through the gate of the triac 120 when the triggering circuit 122 begins conducting. However, the firing capacitor 126 is not necessary for proper operation of the power supply 110, since the gate current can be drawn through the resistor 124, and may be omitted.

The generated DC voltage $V_{CC}$ has a ripple, and thus, a maximum value ($V_{CC\text{-}MAX}$) that is set by the break-over voltage of the triggering circuit 122 and a minimum value ($V_{CC\text{-}MIN}$) that is dependent on the current drawn by the controller 112 between the times that the triggering circuit 122 breaks over. The break-over voltage $V_{BO}$ of the triggering circuit 122 is preferably the same as the desired maximum value of the DC voltage $V_{CC\text{-}MAX}$, plus the forward voltage drop $V_D$ of two of the diodes in the rectifier bridge 128, i.e., $$V_{BO} = V_{CC\text{-}MAX} + 2*V_D. \quad \text{(Equation 1)}$$

Thus, assuming $V_D$ is 0.6 volts, and that the desired $V_{CC\text{-}MAX}$ is 5.1 volts, then $V_{BO}$ is preferably approximately 6.3 volts.

Since the break-over voltage $V_{BO}$ is related to the desired maximum value of the DC voltage $V_{CC\text{-}MAX}$ (as shown in Equation 1), the triggering circuit 122 begins conducting current, and thus the triac 120 begins conducting current, in response to the DC voltage $V_{CC}$ across the storage capacitor 130 reaching $V_{CC\text{-}MAX}$. As a result, the voltage across the triac 120 drops to a substantially low voltage (e.g., 1.5 volts), which causes the storage capacitor 130 to stop charging. Accordingly, the power supply 110 exhibits a closed loop control scheme since the time that the storage capacitor 130 stops charging is dependent upon the DC voltage $V_{CC}$ across the storage capacitor.

As the storage capacitor 130 charges, a wallstation voltage, $V_{WS}$, which is equal to the present value of the DC voltage $V_{CC}$ of the power supply 110, plus two diode voltage drops $V_D$, i.e., $$V_{WS} = V_{CC} + 2*V_D, \quad \text{(Equation 2)}$$

develops across the terminals H1 and H2 for a time period during each half-cycle until the voltage developed across the firing capacitor 126 reaches the break-over voltage $V_{BO}$ of the triggering circuit 122 and the triac 120 begins conducting. During the time that the triac 120 is non-conducting and the wallstation voltage $V_{WS}$ develops across the firing capacitor 126 and thus the wallstation 104, the load current flows through the limiting resistor 124, the rectifier bridge 128, and the storage capacitor 130, which charges to the voltage $V_{CC\text{-}MAX}$. During this time, the charging circuit imposes a low voltage drop relative to the peak of the AC voltage when current is flowing through the power supply 110 to the load. The resistor 124 preferably has a small resistance so that only an insignificant voltage is developed across the resistor when the load current is flowing through the storage capacitor 130. Thus, the maximum voltage drop across the wallstation 104 when the triac 120 is non-conducting is approximately the same as the break-over voltage $V_{BO}$ of the triggering circuit 122 (assuming the voltage drop across the resistor 124 is small).

FIGS. 5A, 5B, and 5C show waveforms demonstrating the operation of the power supply 110. FIG. 5A shows a line voltage waveform 200 and an output voltage waveform 210 (i.e., the voltage measured from the load-side terminal of the wallstation 104 to neutral of the system 100). The power supply 110 induces only a minimal amount of distortion in the output voltage waveform 210 as a result of a voltage drop, ΔV, which is developed across the wallstation 104, and which is substantially equal to the break-over voltage $V_{BO}$. Note that no voltage is provided to the load during a short interval 200A at the beginning of each half-cycle, until the voltage across the wallstation exceeds the present value of the DC voltage $V_{CC}$ plus two diode voltage drops $V_D$, i.e., $V_{CC} + 2*V_D$.

FIG. 5B show a DC voltage waveform 220 of the DC voltage $V_{CC}$ that is generated by the power supply 110. Until the voltage across the firing capacitor 126 (i.e., the voltage across the rectifier bridge 128) exceeds the break-over voltage $V_{BO}$, the storage capacitor 130 charges to the voltage $V_{CC\text{-}MAX}$, for a time interval, ΔT. The time interval ΔT is dependent upon the break-over voltage of the triggering circuit 122, and the minimum value $V_{CC\text{-}MIN}$, which is determined by the current drawn by the low-voltage circuitry connected to the storage capacitor 130 (i.e., the controller 112).

FIG. 5C show a bridge voltage waveform 230 of the voltage measured across the input terminals AC1, AC2 of the rectifier bridge 128. The bridge voltage waveform 230 is slightly less than the break-over voltage $V_{BO}$ of the trigger circuit 122 and increasing when the storage capacitor 130 is charging. After reaching the break-over voltage $V_{BO}$ (approximately 6.3V in the power supply 110 of the present invention), the bridge voltage waveform 230 drops to approximately 1V (i.e., the voltage drop across the triac 120). The bridge voltage waveform 230 is substantially the same as the voltage waveform measured across the wallstation 104 since the voltage drop across the resistor 124 is negligibly small.

The waveforms of FIGS. 5A, 5B, and 5C are shown solely to demonstrate the operation of the power supply 110. The waveforms as shown would result from a resistive load connected between the load-side terminal of the wallstation 104 closest to the loads and neutral of the AC supply 102, i.e., with a resistive load in place of the light/motor control unit 106 (see FIG. 2). However, a reactive load (such as the combination of the light/motor control unit 106, the fan motor 108, and the lighting load 109) causes a phase shift between the voltage and the current through the wallstation 104. Accordingly, this shifts the position of the charging time interval ΔT relative to the zero-crossing of the line voltage waveform 200, i.e., to some other time later in the half-cycle.

The light/motor control unit 106 utilizes the zero-crossings of the line voltage waveform to control the motor load 108 and the lighting load 109. If the charging time interval ΔT of the power supply 110 of the wallstation 104 occurs near the zero-crossings, the light/motor control unit may encounter "zero-crossing noise", which may cause the lighting load 109 to flicker and motor load 108 to be controlled incorrectly. Zero-crossing noise occurs when the zero-crossings of the line voltage waveform is inconsistent from one line-cycle to the next.

Preferably, the charging time interval ΔT does not occur near the zero-crossings to reduce the possibility of noise in the detection of the zero-crossings. Further, the charging time interval ΔT should be a constant length of time from one half-cycle to the next. To ensure that the charging time interval ΔT each half-cycle, the wallstation 104 employs the dummy load 119 to draw current when the communication circuit 116 is not transmitting.

Referring to FIG. 4A, the dummy load 119 comprises a PNP bipolar-junction transistor (BJT) 132 coupled between the DC voltage $V_{CC}$ and a dummy load resistor 134. The base of the transistor 132 is coupled to the communication-enable signal 117B through a base resistor 136, e.g., having a resistance of 4.7 kΩ. When the communication-enable signal 117B is high (i.e., the communication circuit 116 is transmitting), the base of the transistor 132 is also pulled high and no current flows through the dummy load resistor 134. However, when the communication-enable signal 117B is low (i.e., the communication circuit 116 is disabled), the transistor 132 is conductive and the dummy load resistor 134 draws a predetermined current from the storage capacitor 130. The dummy load resistor 134 is preferably sized such that the predetermined current is substantially the same as the current draw of the communication circuit 116. For example, the dummy load resistor 134 may have a resistance of 375Ω if the current drawn by the communication circuit 116 is 12 mA (assuming a saturation voltage of the transistor 132 of 0.3 V and an average DC voltage of 4.8 V across the storage capacitor 130).

Figure 6:
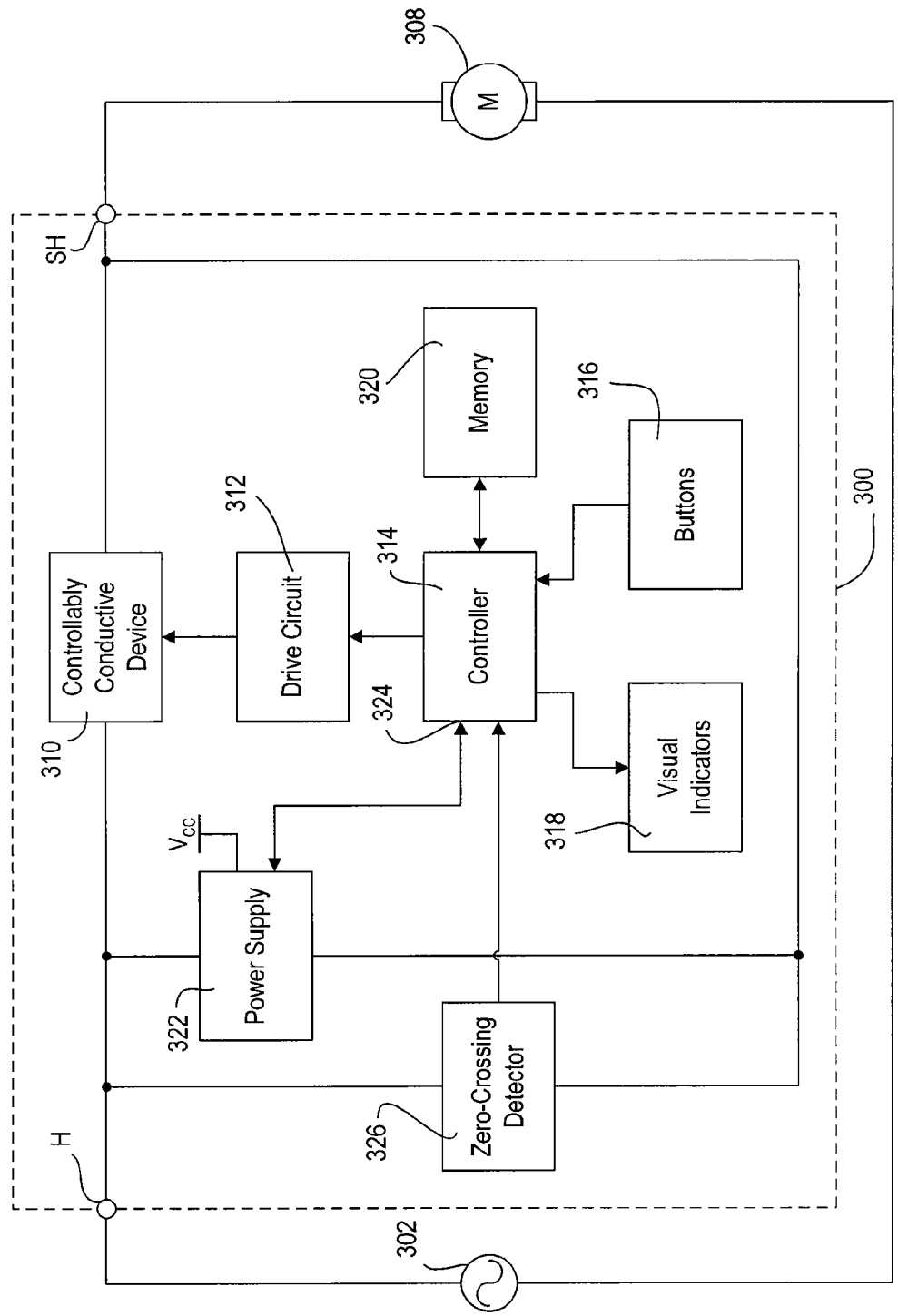
FIG. 6 is a simplified block diagram of a load control device according to a second embodiment of the present invention.

FIG. 6 is a simplified block diagram of a load control device 300 according to a second embodiment of the present invention. The load control device 300 is coupled in series electrical connection between an AC power source 302 and an electrical load, such as, for example, a fan motor 308. The load control device 300 preferably operates as an electrical timer, i.e., the load control device operates to turn off the fan motor 308 at the end of a preset timeout period after the fan motor is turned on. An electronic timer is described in greater detail in commonly-assigned U.S. patent application Ser. No. 11/521,234, filed Sep. 13, 2006, entitled WALL-MOUNTABLE TIMER FOR AN ELECTRICAL LOAD, the entire disclosure of which is hereby incorporated by reference.

Often, an electronic timer is used to control an exhaust fan in a bathroom, such that the exhaust fan is turned off after a predetermined amount of time (i.e., the preset timeout period) has elapsed since the exhaust fan was turned on. In order to provide the maximum air circulation of an exhaust fan, the exhaust fan must be provided with substantially all of the rated voltage when the fan is on. Therefore, the load control device 300 according to the present invention provides substantially all of the AC source voltage of the AC power source 302 to the fan motor 308 when the fan is on. Specifically, if the fan motor 308 is rated for 120 VAC, the load control device 300 provides at least 112 VAC, and preferably 118 VAC, to the fan motor.

Referring back to FIG. 6, the load control device 300 is coupled to the AC power source 302 via a hot terminal H and to the fan motor 308 via a switched-hot terminal SH. The load control device 300 comprises a controllably conductive device 310 for control of the power delivered to the fan motor 308. The controllably conductive device 310 is preferably implemented as a bidirectional semiconductor switch, specifically, a triac, but may comprise any suitable other type of suitable bidirectional semiconductor switch (such as, for example, a triac, a FET in a rectifier bridge, or two FETs in anti-series connection) or a relay. The controllably conductive device 310 includes a control input, which is coupled to a drive circuit 312. The controllably conductive device 310 is operable to turn on the electrical load by conducting a load current having a great enough magnitude to energize the load, and to turn off the electrical load by conducting a load current having a small enough magnitude, so as not to energize the load. For example, a fan motor is energized if the load current conducted through the fan motor causes the fan motor begin to rotate and a lighting load is energized if the load current conducted through the lighting load causes the lighting load to illuminate to an intensity visible by a user.

A controller 314 is coupled to the drive circuit 312 for providing control signals to the control input of the controllably conductive device 310. The controller 314 is preferably implemented as a microcontroller, but may be any suitable processing device, such as a programmable logic device (PLD), a microprocessor, or an application specific integrated circuit (ASIC). The controller 314 is operable to render the controllably conductive device 310 conductive or non-conductive to control the power supplied to the fan motor 308. Since the load control device 300 is operating as an electronic timer, the controller 314 preferably drives the controllably conductive device 310 into substantially full conduction to enable the delivery of power to the fan motor 308, i.e., substantially all of the AC source voltage 302 is provided to the fan motor, such that the fan motor is on (i.e., energized). Conversely, the controller 314 maintains the controllably conductive device 310 non-conductive to prevent the delivery of power to the fan motor 308 and to turn the fan motor off (i.e., not energized).

The controller 314 receives inputs from a plurality of buttons 316 and controls a plurality of visual indicators 318. The buttons 316 may comprise, for example, a toggle actuator for turning on (i.e., enabling power to be delivered to) and turning off (i.e., discontinue delivering power to) the fan motor 308. The buttons 316 may also comprise a timer adjustment actuator for adjusting the preset timeout period. The controller 314 is also coupled to a memory 320 for storage of configuration information of the load control device 300, such as, for example, the present value of the preset timeout period.

A power supply 322 generates a direct-current (DC) voltage $V_{CC}$ (e.g., approximately 5.2V), for powering the controller 314, the memory 320, and other low-voltage circuitry of the load control device 300. The controller 314 is coupled to the power supply 322 through a port 324, such that the controller 314 is operable to control the operation of the power supply. A dimmer having a microprocessor-controlled power supply is disclosed in co-pending commonly-assigned U.S. patent application Ser. No. 11/480,146, filed Jun. 30, 2006, entitled DIMMER HAVING A MICROPROCESSOR-CONTROLLED POWER SUPPLY, the entire disclosure of which is hereby incorporated by reference in its entirety.

The power supply 322 may comprise, for example, a cat-ear power supply. A cat-ear power supply draws current only near the zero-crossings of the AC voltage source 302 and derives its name from the shape of the current waveform that it draws from the AC voltage source 302. A zero-crossing is defined as the time at which the current through the load control device 300 transitions from positive to negative polarity, or from negative to positive polarity. When the load is a resistive load, the zero-crossings occur when the AC supply voltage transitions from positive to negative polarity, or from negative to positive polarity, at the beginning and end of each half-cycle. However, loads having lower power factors (e.g., exhaust fans) cause the current through the load control device 300 to be out-of-phase with the AC supply voltage, and thus, the zero-crossings of the current through the load control device do not occur when the AC supply voltage transitions from positive to negative polarity, and vice versa.

Because the load control device 300 only has two terminals H, SH, the power supply 322 must draw current through the connected fan motor 308. In order for the power supply 322 to be able to draw sufficient current, the controllably conductive device 310 must be non-conductive so that a sufficient voltage is available across the power supply. Thus, the controllably conductive device 310 cannot be turned on for the entire length of a half-cycle, even when the fan motor 308 is on. The magnitude of the current drawn by the power supply 322 is not sufficient enough to energize the fan motor 308 when the fan motor is off.

Figures 7A, 7B, 7C:
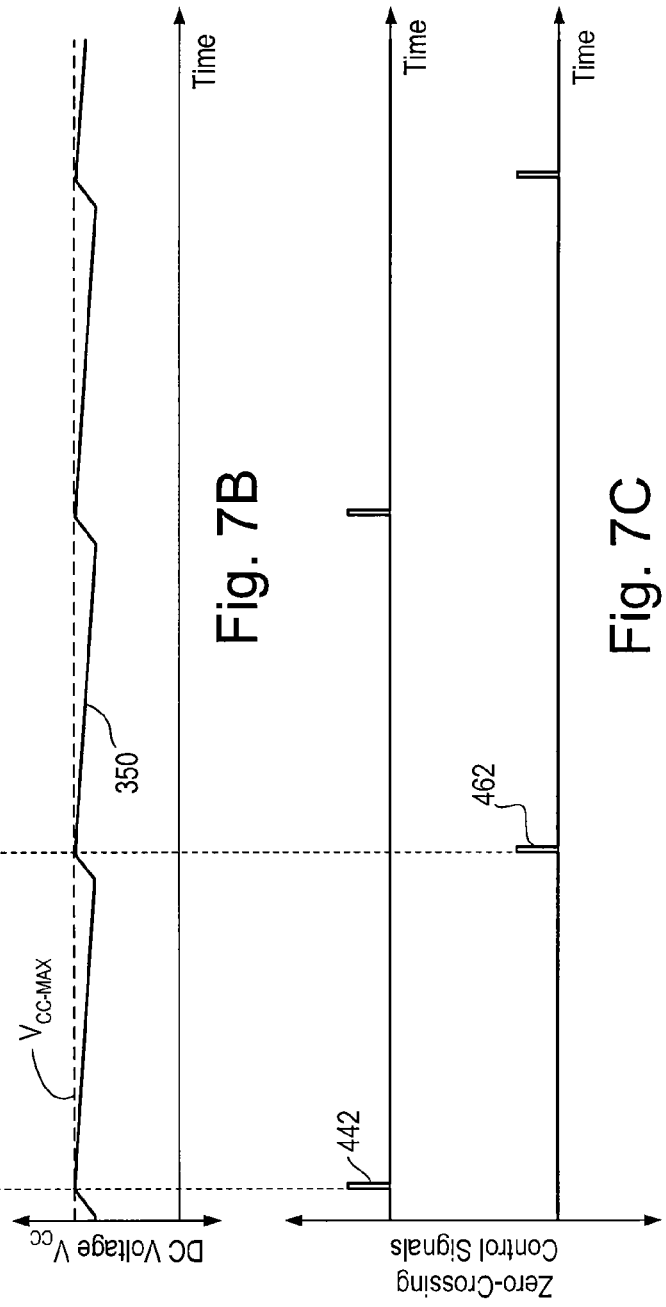
FIGS. 7A, 7B, and 7C show waveforms demonstrating the operation of the load control device of FIG. 6.

As previously mentioned, the load control device 300 according to the present invention is operable to provide substantially all of the AC source voltage of the AC power source 302 to the electrical load, while still allowing the power supply 322 to charge. FIGS. 7A, 7B, and 7C show waveforms demonstrating the operation of the load control device 300 (with a resistive load). When the electrical load is on, the controller 314 maintains the controllably conductive device 310 non-conductive at the beginning of each half-cycle. Because the controllably conductive device 310 is non-conductive, a voltage $V_{PS}$ develops across the power supply 322. The power supply 322 begins charging by drawing current from the AC power source 302 through the electrical load. The voltage VPs, which develops across the power supply 322 when the power supply is charging, is only slightly larger than the DC voltage $V_{CC}$ (e.g., approximately 12V). Accordingly, substantially all of the AC supply voltage is provided to the electrical load while the power supply is charging.

FIG. 7A shows an AC source voltage waveform 330 of the AC power source 302 and a switched-hot voltage waveform 340 (i.e., the voltage measured from the switched-hot terminal SH of the load control device 300 to neutral of the AC power source 302) when the electrical load is on. At the beginning of each half-cycle, the load control device 300 induces only a minimal amount of distortion in the switched-hot voltage waveform 340 as a result of the voltage $V_{PS}$ developed across the load control device 300. Since the controllably conductive device 310 is preferably implemented as a triac, the controllably conductive device becomes non-conductive at the end of each half-cycle when the current through the triac falls to substantially zero volts.

FIG. 7B show a DC voltage waveform 350 of the DC voltage $V_{CC}$ that is generated by the power supply 110. The power supply 322 is operable to stop charging when the DC voltage $V_{CC}$ reaches a predetermined value, i.e., a maximum DC voltage $V_{CC\text{-}MAX}$ as shown in FIG. 7B.

Referring back to FIG. 6, a zero-crossing detector 326 is coupled across the power supply 322 and provides a control signal to the controller 314 when the power supply has stopped charging each half-cycle, i.e., at time 340A shown in FIG. 7A. When the fan motor 308 is on, the controller 314 renders the controllably conductive device 310 conductive immediately after the power supply 322 has stopped charging each half-cycle, immediately after receiving the control signal from the zero-crossing detector 326. Thus, current is not conducted from the AC power source 302 to the fan motor 308 for a brief period of time each half-cycle, and the load control device 300 provides substantially all of the AC supply voltage to the fan motor, while still allowing the power supply 322 to charge appropriately.

Figure 8A:
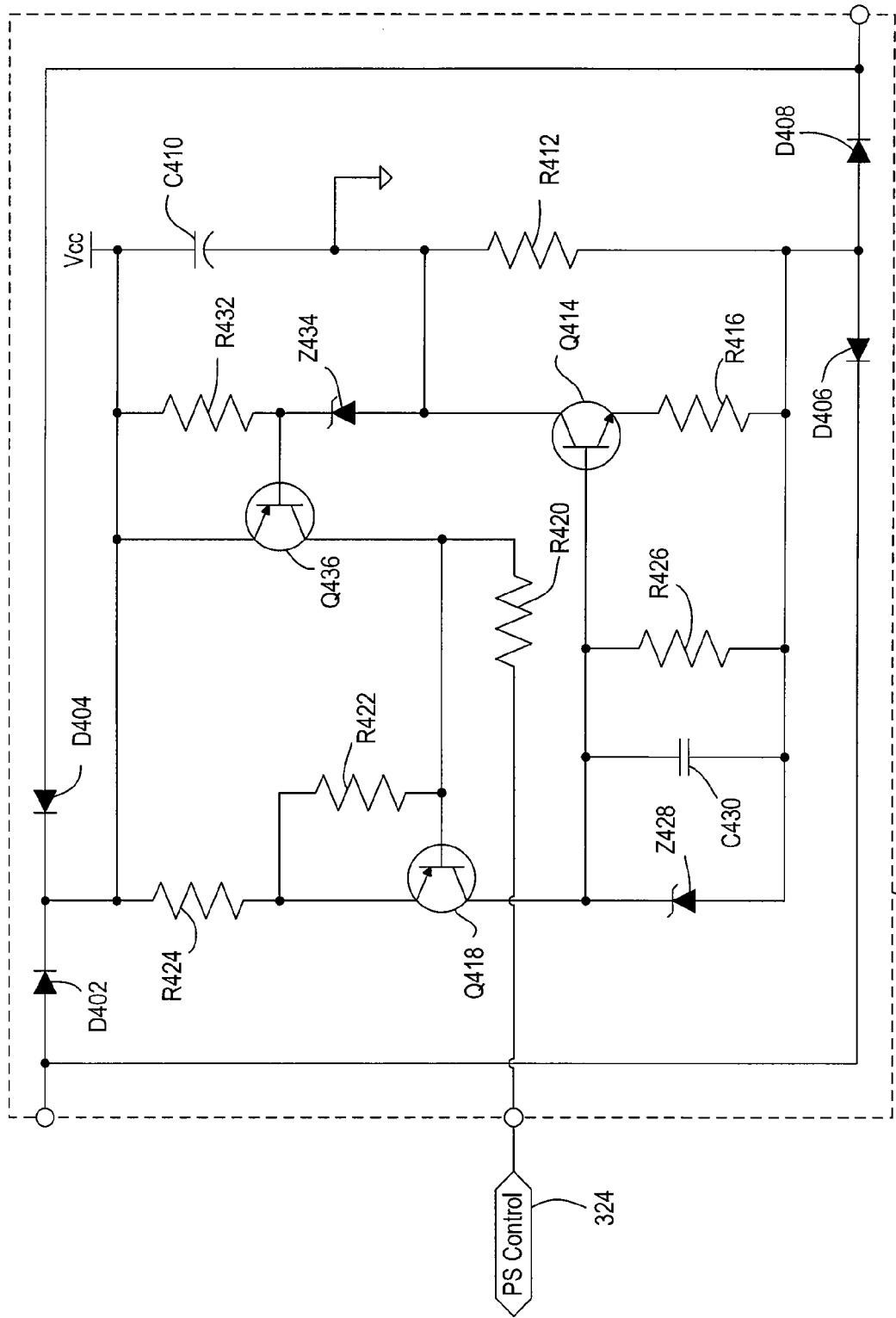
FIG. 8A is a simplified schematic diagram of a cat-ear power supply of the load control device of FIG. 6.

FIG. 8A is a simplified schematic diagram of the cat-ear power supply 322 according to the present invention. The power supply 322 is provided inside of a full-wave bridge rectifier comprising diodes D402, D404, D406, D408, such that the power supply is able to produce the DC voltage $V_{CC}$ across an energy storage element, for example, an energy storage capacitor C410. The rectifier bridge allows the power supply 322 to draw current in both half-cycles of the AC source voltage. Alternatively, the power supply 322 could include a half-wave rectifier. The energy storage capacitor preferably has a capacitance of approximately 680 μF.

The power supply 322 includes a passive charging circuit comprising a "boot-strap" resistor R412. The resistor R412 allows the energy storage capacitor C410 to begin charging before the controller 314 is powered up and running, such that the energy storage capacitor C410 is only charged by the current flowing through the resistor R412 and the impedance of the fan motor 308. The resistor R412 preferably has a resistance of 15 kΩ, which is suitably low enough to ensure sufficient current is available to bring the microcontroller out of the internal low-voltage reset mode. During the time when the energy storage capacitor C410 is charging through the boot-strap resistor R412, the majority of the current drawn from the power supply 322 (i.e., drawn by the controller 314 and the other low-voltage circuitry) is minimal since the controller is unpowered or in reset mode. The energy storage capacitor C410 charges through the boot-strap resistor R412 until the controller 314 is running and able to control the power supply 322.

Once powered, the controller 314 can enable an active charging circuit for the energy storage capacitor C410 through an NPN transistor Q414 (e.g., part number MJD47T4 manufactured by On Semiconductor) and a resistor R416. The resistor R416 has a low resistance (preferably 12Ω), which provides a charging current through the energy storage capacitor C410 of a much greater magnitude than the charging current through the passive charging circuit comprising the resistor R412, thus allowing the energy storage capacitor C410 to charge at a greater rate, i.e., with a smaller time constant. The voltage generated across the active charging path (i.e., across the resistor R412 and the collector-emitter connection of the transistor Q414) while the energy storage capacitor C410 is charging through the active charging path is approximately 4-5 volts, such that the voltage $V_{PS}$ across the power supply 322 is approximately 12 volts.

The controller 314 is coupled to the base of a PNP transistor Q418 (e.g., part number MMBTA92 manufactured by On Semiconductor) through a resistor R420 (preferably having a resistance of 4.7 kΩ). When the energy storage capacitor C410 is charging through the resistor R412 during start up, the port 324 of the controller 314 that is connected to the resistor R420 is maintained as a high impedance and the transistor Q414 is non-conductive. After powering up, the controller 314 can enable the active charging circuit by pulling the port 324 low and thereby pulling down the base of the transistor Q418. Thus, a voltage is produced across a resistor R422 and the emitter-base junction of the transistor Q418 allowing current flow through the transistor Q418 and an emitter resistor R424. The resistors R422, R424 preferably have resistances of 10 kΩ and 510Ω, respectively.

The current flow through the transistor Q418 produces a voltage across a resistor R426 coupled across the base-emitter junction of the transistor Q414 and provides base current for the transistor Q414. This enables the active charging circuit of the energy storage capacitor C410, allowing the charging current for the energy storage capacitor C410 to flow through the transistor Q414 and the resistor R416. The current through the transistor Q414 is limited by the resistor R416 and a zener diode Z428 (preferably having a break-over voltage of 3.9V, e.g., part number MMSZ4684ET1 manufactured by On Semiconductor). A capacitor C430 is coupled across the resistor R426 and provides some time delay in the disabling of the active charging circuit. Accordingly, when the electrical load is an inductive load (i.e., the motor load 308), the time delay of capacitor C430 prevents the active charging circuit from being disabled abruptly, which causes overshoot and ringing in the DC voltage $V_{CC}$. Preferably, the resistor R426 has a resistance of 10 kΩ and the capacitor C430 has a capacitance of 0.1 μF.

The power supply 322 further includes a hardware shut-off circuit having a PNP transistor Q436, a resistor R432, and a zener diode Z434. The resistor R432 (preferably having a resistance of 10 kΩ) and the zener diode Z434 are coupled in series across the energy storage capacitor C410, with the anode of the zener diode connected to circuit common. The PNP transistor Q436 (e.g., part number MBT3906DW1T1 manufactured by On Semiconductor) is coupled between the DC voltage $V_{CC}$ and the base of the transistor Q418. The base of the transistor Q436 is connected to the junction of the resistor R432 and the zener diode Z434. The zener diode Z434 preferably has a break-over voltage of 4.7V (e.g., part number MMSZ4688ET1 manufactured by On Semiconductor), which determines the maximum DC voltage $V_{CC\text{-}MAX}$ (e.g., 5.2V) of the power supply 322 as shown in FIG. 7B. When the voltage across the energy storage capacitor C410 reaches the maximum DC voltage $V_{CC\text{-}MAX}$ (i.e., the DC voltage $V_{CC}$ is at an appropriate level), current flows through the zener diode Z434 and the resistor R432, producing a voltage across the resistor. Thus, the transistor Q436 begins to conduct, pulling the base of the transistor Q418 up to the DC voltage $V_{CC}$. This overrides the control signal from the port 324 of the controller 314 and disables the active charging circuit through the transistor Q414 and the resistor R416.

When the active charging path is enabled, the power supply 322 conducts a non-sinusoidal current having, for example, a peak magnitude of approximately 300 mA. If the fan motor 308 controlled by the load control device 300 is an exhaust fan, the magnitude of the non-sinusoidal current drawn through active charging path of the power supply 322 is substantial enough to cause audible noise in the exhaust fan when the fan is off. To control the fan motor 308 to be off, the controller 314 of the load control device 300 of the present invention renders the controllably conductive device 310 non-conductive for the entire length of each half-cycle of the AC power source 304. Preferably, the load control device 300 disables the active charging path when the fan motor 308 if off to allow the energy storage capacitor C410 to charge through the boot-strap resistor R412. Thus, the power supply 322 draws a small substantially sinusoidal current (i.e., a continuous current) through the passive charging path (i.e., the boot-strap resistor R412, which is sized at 15 kΩ). The magnitude of the small sinusoidal current (e.g., 11 $mA_{RMS}$) is large enough to allow the power supply 322 to charge each half-cycle and small enough such that the exhaust fan does not generate audible noise when the exhaust fan is off.

Figure 8B:
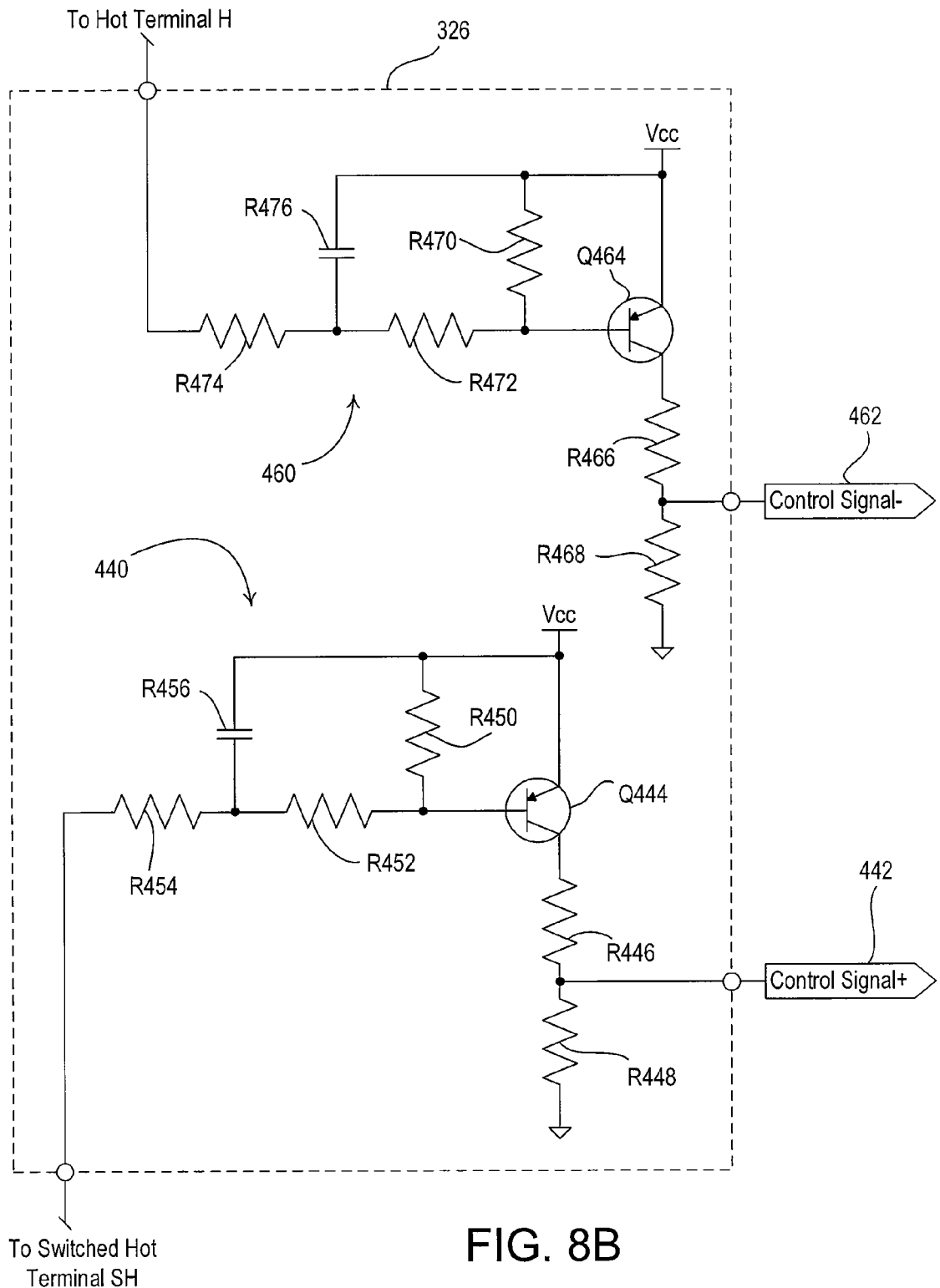
FIG. 8B is a simplified schematic diagram of the zero-crossing detector of the load control device of FIG. 6.

FIG. 8B is a simplified schematic diagram of the zero-crossing detector 326 of the load control device 300. A first zero-crossing circuit 440 generates a positive zero-crossing control signal 442 (shown in FIG. 7C) during the positive half-cycles of the AC power source. The positive zero-crossing control signal 442 includes a positive pulse when the zero-crossing detector 326 detects that the power supply 322 has finished charging (i.e., at the time 340A in FIG. 7A). Similarly, a second zero-crossing circuit 460 generates a negative zero-crossing signal 462 (shown in FIG. 7C) during the negative half-cycles of the AC power source.

The first zero-crossing circuit 440 comprises an NPN transistor Q444 (e.g., part number MBT3906DW1T1 manufactured by On Semiconductor). The transistor Q444 has an emitter coupled to the DC voltage $V_{CC}$ and a collector coupled to circuit common through two series-connected resistors R446, R448, preferably having resistances of 22 kΩ and 37.4 kΩ, respectively. The positive zero-crossing control signal 442 is provided at the junction of the resistors R446, R448. The DC voltage $V_{CC}$ is coupled to the switched-hot terminal SH of the load control device 300 through three resistors R450, R452, R454, preferably having resistances of 10 kΩ, 21.5 kΩ, and 220 kΩ. A capacitor C458 is coupled across the combination of resistors R450, R452, and preferably has a capacitance of 0.01 μF. The junction of resistors R450, R452 is coupled to the base of the transistor Q444.

Since the DC voltage $V_{CC}$ is simply coupled to the hot terminal H through a single diode (e.g., the diode D402 of the power supply 322), the first zero-crossing circuit 440 is responsive to the voltage developed between the hot terminal H and the switched-hot terminal SH during the positive half-cycles of the AC power source 302. While the power supply 322 is charging the energy storage capacitor C410, the voltage $V_{PS}$ across the power supply and thus across the load control device 300 is substantially small, i.e., approximately 10V. Accordingly, the voltage developed across the resistor R452 is not substantial enough to turn on the transistor Q444 and the positive zero-crossing control signal 442 is pulled down to circuit common, e.g., substantially zero volts.

However, when the power supply 322 has finished charging the energy storage capacitor C410, the hardware shutoff circuit disables the active charging path. At this time, the voltage across the load control device 300 quickly increases to substantially the AC source voltage of the AC power source 302. A larger current flows out of the switched-hot terminal SH, such that the voltage developed across the resistor R450 is substantial enough to cause the transistor Q444 to begin to conduct. Accordingly, the positive zero-crossing control signal 442 is pulled up as shown in FIG. 7A. Since the microcontroller 314 renders the controllably conductive device 310 conductive immediately after the positive zero-crossing control signal 442 is provided (i.e., "goes high"), the voltage across the load control device drops to approximately 1V (i.e., the voltage drop across the controllably conductive device 130) and the positive zero-crossing control signal 442 is pulled down to circuit common. Thus, the first zero-crossing circuit 400 produces a pulse on the positive zero-crossing control signal 442 when the power supply 322 has finished charging during each positive half-cycle.

The second zero-crossing circuit 460 operates in a similar fashion as the first zero-crossing circuit 440, except that the resistor R474 is coupled to the hot terminal H of the load control device 300. The second zero-crossing circuit 460 is thus responsive to the voltage develop between the switched-hot terminal SH and the hot terminal H during the negative half-cycles of the AC power source 304. Accordingly, the second zero-crossing circuit 460 generates the negative zero-crossing control signal 462 during the negative half-cycles of the AC power source 302.

Figure 9:
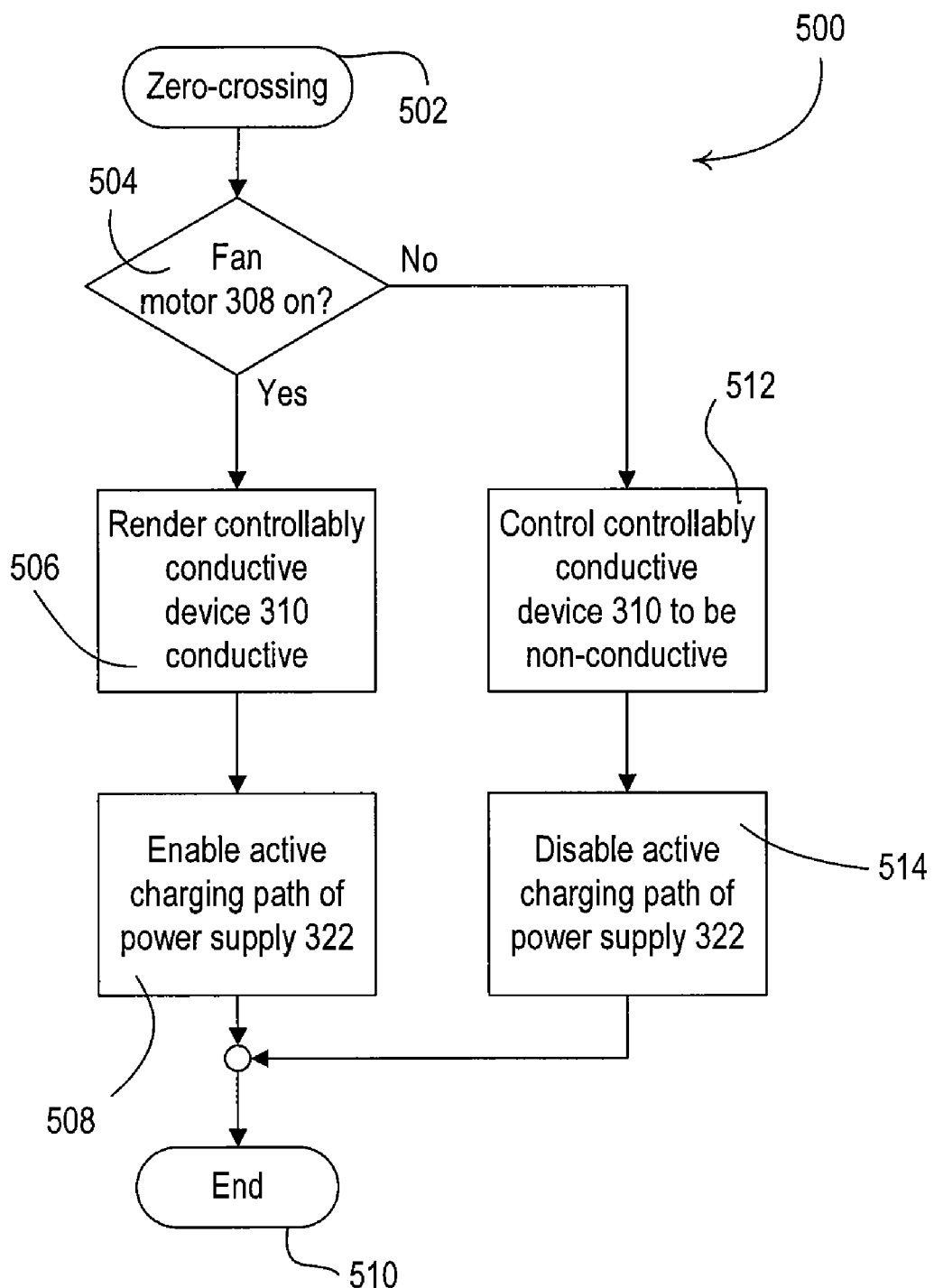
FIG. 9 is a simplified flowchart of a zero-crossing procedure executed by the controller of the load control device of FIG. 6 according to the present invention.

FIG. 9 is a simplified flowchart of a zero-crossing procedure 500 according to the present invention. The zero-crossing procedure 500 is executed by the controller 314 in response to receiving a zero-crossing signal from the zero-crossing detector 326 at step 552 (i.e., once every half-cycle of the AC power source 302). If the fan motor 308 should be on at step 504, the controller 314 renders the controllably conductive device 310 conductive immediately at step 506. Therefore, the controllably conductive device 310 is rendered conductive without delay after the power supply 322 stops charging and the zero-crossing detector 326 detects a zero-crossing. The controller 314 then enables the active charging path of the power supply 322 at step 506 and exits the procedure 500 at step 510. Since the controllably conductive device 310 is preferably implemented as a triac, the controllably conductive device becomes non-conducive at the end of each half-cycle.

If the fan motor 308 should not be on at step 504, the controller 314 controls the controllably conductive device 310 to be non-conductive at step 510 to turn off the fan motor 308. In other words, when the controllably conductive device 310 is implemented as a triac, the controller 314 does not render the triac conductive at step 512. The controller 314 then disables the active charging path of the power supply 322 at step 514 to allow the energy storage capacitor C410 to charge through the boot-strap resistor R412 while the fan motor 308 is off, and exits the procedure 500 at step 510.

The waveforms of FIGS. 7A, 7B, and 7C are shown solely to demonstrate the operation of the load control device 300. The waveforms as shown would result from a resistive load or a motor load having a high power factor. A reactive load, such as an exhaust fan (i.e., a motor load having low power factor), will cause a phase shift between the voltage and the current through the load control device 300. This shifts the position of the pulses of the positive and negative zero-crossing signals 452, 462 charging time interval ΔT relative to the zero-crossings of the AC source voltage waveform 330, i.e., to some other time later in the half-cycle.

The wallstations 104 of the first embodiment of the present invention and the load control device 300 of the second embodiment of the present invention operate on the same principles to provides substantially all of the AC source voltage to the connected electrical load(s), while still generating a DC voltage to power the internal low-voltage circuitry. Both devices have a controllably conductive device (e.g., the triac 120 and the controllably conductive device 310), which is coupled in series with the load for control of the power delivered to the load. Both devices maintain the controllably conductive device non-conductive at the beginning of each half-cycle to allow an energy storage capacitor (e.g., the storage capacitors 130, C414) to charge through a charging circuit (e.g., the rectifier bridge 128 and the power supply 322). Both devices have a control circuit for rendering the controllably conductive device conductive immediately after the energy storage capacitor has charged to a predetermined level. In the wallstation 104, the triggering circuit 122 operates as the control circuit to fire the triac when the voltage across the storage capacitor 130 exceeds the break-over voltage $V_{BO}$ of the triggering circuit minus two diode drops. In regards to the load control device 300, the controller 314 (e.g., a microprocessor) operates to render the controllably conductive device 310 conductive when the voltage across the storage capacitor C414 has reached maximum DC voltage $V_{CC-MAX}$. The controller 314 uses the zero-crossing detector 326 to determine when the power supply 322 has stopped charging the storage capacitor C414 each half-cycle.

Although the words "device" and "unit" have been used to describe the elements of the systems for control of lights and fan motors of the present invention, it should be noted that each "device" and "unit" described herein need not be fully contained in a single enclosure or structure. For example, the light/motor control unit 106 may comprise a controller in a wall-mounted device and fan motor control circuit in a separate location, e.g., in the canopy of the fan motor and the lamp. Also, one "device" may be contained in another "device".

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A load control device for controlling the amount of power delivered to an electrical load from an AC power source, the load control device comprising:
    a controllably conductive device adapted to carry a load current from the AC power source to the load when the controllably conductive device is conductive;
    a power supply comprising an energy storage device and adapted to charge the energy storage device when the controllably conductive device is non-conductive; and
    a controller operable to determine when the power supply has charged the energy storage device to a predetermined amount of energy and to subsequently cause the controllably conductive device to become conductive immediately after determining that the power supply has charged the energy storage device to the predetermined amount of energy;
    wherein the power supply comprises a passive charging path for the energy storage device, and an active charging path for the energy storage device, the passive charging path allowing the energy storage device to receive energy at a first rate, the active charging path allowing the energy storage device to receive energy at a second rate greater than the first rate.

2. The load control device of claim 1, wherein the power supply only charges the energy storage device through the active charging path near the zero-crossings of the load current.

3. The load control device of claim 2, further comprising:
    a zero-crossing detector operable to provide a control signal to the controller when the power supply has stopped charging.

4. The load control device of claim 3, wherein the controller causes the controllably conductive device to become conductive in response to the control signal provided by the zero-crossing detector.

5. The load control device of claim 4, wherein the controller comprises a microprocessor.

6. The load control device of claim 2, wherein the power supply comprises a cat-ear power supply.

7. The load control device of claim 1, wherein the controller is coupled to the power supply to selectively enable and disable the active charging path.

8. The load control device of claim 7, wherein the controller is operable to enable the active charging path when the electrical load is on.

9. The load control device of claim 7, wherein the controller is operable to disable the active charging path when the electrical load is off.

10. The load control device of claim 1, wherein the energy storage device comprises a storage capacitor.

11. The load control device of claim 10, wherein the power supply comprises a rectifier coupled across the controllably conductive device for supplying a DC voltage to the storage capacitor.

12. The load control device of claim 11, wherein the rectifier comprises a rectifier bridge.

13. The load control device of claim 1, wherein the controllably conductive device comprises a semiconductor switch.

14. The load control device of claim 6, wherein the semiconductor switch comprises a triac.

15. The load control device of claim 6, wherein the semiconductor switch comprises a FET in a rectifier bridge.

16. The load control device of claim 6, wherein the semiconductor switch comprises two FETs in anti-series connection.

17. The load control device of claim 1, further comprising:
a communication circuit coupled to the controller and operable to transmit control information for controlling the electrical load.

18. The load control device of claim 1, wherein the load control device operates as an electronic timer.

19. The load control device of claim 1, wherein the power supply imposes a low voltage drop relative to the peak value of the AC voltage such that substantially all of the AC voltage is available to the load during the time when the controllably conductive device is non-conductive.

20. A method of controlling the amount of power delivered to an electrical load from an AC power source, the method comprising the steps of:
coupling a controllably conductive device in series electrical connection between the AC voltage source and the electrical load;
controlling the controllably conductive device to be conductive each half-cycle of the AC power source to turn the load on;
controlling the controllably conductive device to be non-conductive each half-cycle of the AC power source to turn the load off;
charging an energy storage device by conducting a substantially sinusoidal current having a first magnitude through the energy storage device when the load is off; and
charging the energy storage device by conducting a non-sinusoidal current having a second magnitude through the energy storage device when the load is on, the second magnitude greater than the first magnitude.

21. The method of claim 20, further comprising the step of:
determining when the energy storage device has charged to a predetermined amount of energy.

22. The method of claim 21, further comprising the step of:
generating a control signal representative of when the energy storage device has charged to the predetermined amount of energy;
wherein the step of rendering the controllably conductive device conductive is completed in response to the control signal.

23. The method of claim 20, wherein the step of rendering the controllably conductive device conductive occurs immediately after the energy storage device has charged to the predetermined amount of energy.

24. The method of claim 20, wherein a low voltage drop relative to the peak value of the AC voltage is developed across the controllably conductive device and substantially all of the AC voltage is available to the load during the time when the controllably conductive device is non-conductive.

25. A load control device for controlling the amount of power delivered to an electrical load from an AC power source, the load control device comprising:
a controllably conductive device adapted to control the amount of power delivered from the source to the load to turn the load on and off;
a power supply comprising an energy storage device, a passive charging path for charging the energy storage device, and an active charging path for charging the energy storage device, the passive charging path operable to conduct a substantially sinusoidal current having a first magnitude when the active charging path is disabled, the active charging path operable to conduct a non-sinusoidal current having a second magnitude greater than the first magnitude when the active charging path is enabled; and
a controller coupled to the power supply and operable to enable the active charging path when the load is on and to disable the active charging path when the load is off.

* * * * *